United States Patent
Eschrich et al.

(10) Patent No.: US 8,987,938 B2
(45) Date of Patent: Mar. 24, 2015

(54) HYBRID INVERTER GENERATOR

(75) Inventors: Sven Eschrich, Berglen (DE); Klaus Hahn, Braselton, GA (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 584 days.

(21) Appl. No.: 13/359,736

(22) Filed: Jan. 27, 2012

(65) Prior Publication Data

US 2012/0193988 A1    Aug. 2, 2012

Related U.S. Application Data (60) Provisional application No. 61/436,848, filed on Jan. 27, 2011.

(51) Int. Cl.
| | |
|---|---|
| *H02J 9/00* | (2006.01) |
| *H02J 7/00* | (2006.01) |
| *H02J 9/06* | (2006.01) |
| *B60L 11/12* | (2006.01) |
| *H02P 9/04* | (2006.01) |

(52) U.S. Cl.
CPC ............... *H02J 7/0042* (2013.01); *H02J 9/062* (2013.01); *H02J 9/066* (2013.01); *B60L 11/123* (2013.01); *H02P 9/04* (2013.01); *Y02T 10/7077* (2013.01); *Y02T 10/7005* (2013.01); *Y02T 10/6217* (2013.01); *Y02T 10/642* (2013.01)
USPC .................. 307/46; 307/44; 307/45; 307/64; 307/65; 307/66

(58) Field of Classification Search
CPC ........................................ H02J 9/00
USPC .............................. 307/44, 45, 46, 64, 65, 66
See application file for complete search history.

(56) References Cited

U.S. PATENT DOCUMENTS

| | | | |
|---|---|---|---|
| 5,563,802 | A | 10/1996 | Plahn et al. |
| 6,175,217 | B1 | 1/2001 | Da Ponte et al. |
| 6,392,312 | B1 | 5/2002 | Morris |
| 6,707,170 | B2 | 3/2004 | Fukaya |
| 6,819,007 | B2 | 11/2004 | Fukaya |
| 6,848,407 | B2 | 2/2005 | Kobayashi et al. |

(Continued)

FOREIGN PATENT DOCUMENTS

WO       02/091562       11/2002

OTHER PUBLICATIONS

European Patent Office Extended Search Report for Application No. 12250015.0 dated Dec. 11, 2013 (8 pages).

*Primary Examiner* — Hal Kaplan
(74) *Attorney, Agent, or Firm* — Michael Best & Friedrich LLP (57) ABSTRACT

A hybrid engine and battery generator and a method of operating the same. The generator is controlled to operate in at least three modes: a battery-only mode, a battery charging mode, and a boost mode. In the battery-only mode, the engine is off and an internal battery of the generator is used by an inverter to generate AC output. In the battery charging mode, the engine generates DC power, via an alternator and rectifier, which is used to charge the battery and to supply power to the inverter to generate AC output. In the boost mode, the battery and the engine generate DC power that is used by the inverter to generate an AC output with increased wattage, relative to the battery-only mode and battery charging mode. The generator automatically switches between the modes based on battery level and load demand.

21 Claims, 8 Drawing Sheets

(56) References Cited

U.S. PATENT DOCUMENTS

| | | |
|---|---|---|
| 6,943,531 B2 | 9/2005 | Fukaya |
| 7,064,454 B2 | 6/2006 | Fukaya et al. |
| 7,652,900 B2 | 1/2010 | Fukaya et al. |
| 7,880,331 B2 * | 2/2011 | Bax et al. .................. 307/46 |
| 2003/0107349 A1 | 6/2003 | Haydock et al. |
| 2005/0104377 A1 | 5/2005 | Nakagawa et al. |
| 2005/0263513 A1 | 12/2005 | Leisner et al. |
| 2007/0227470 A1 | 10/2007 | Cole et al. |
| 2008/0266913 A1 | 10/2008 | Brotto et al. |
| 2009/0166113 A1 | 7/2009 | Luo et al. |

* cited by examiner

HYBRID INVERTER GENERATOR

RELATED APPLICATIONS

The present application claims priority to U.S. Provisional Patent Application Ser. No. 61/436,848, filed Jan. 27, 2011, the entire contents of which are hereby incorporated by reference.

BACKGROUND

The invention relates to inverter generators.

SUMMARY

In one embodiment, the invention provides a hybrid engine and battery generator and a method of operating the same. The generator is controlled to operate in at least three modes: a battery-only mode, a battery charging mode, and a boost mode. In the battery-only mode, the engine is off and an internal battery of the generator is used by an inverter to generate AC output. In the battery charging mode, the engine generates DC power, via an alternator and rectifier, which is used to charge the battery and to supply power to the inverter to generate AC output. In the boost mode, the battery and the engine generate DC power that is used by the inverter to generate an AC output with increased wattage, relative to the battery-only mode and battery charging mode. The generator automatically switches between the modes based on battery level and load demand.

In another embodiment, the invention provides a method of operating a hybrid engine and battery generator. The method includes operating the generator in the at least three modes described above. The method further includes automatically switching between the modes based on battery level and load demand.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
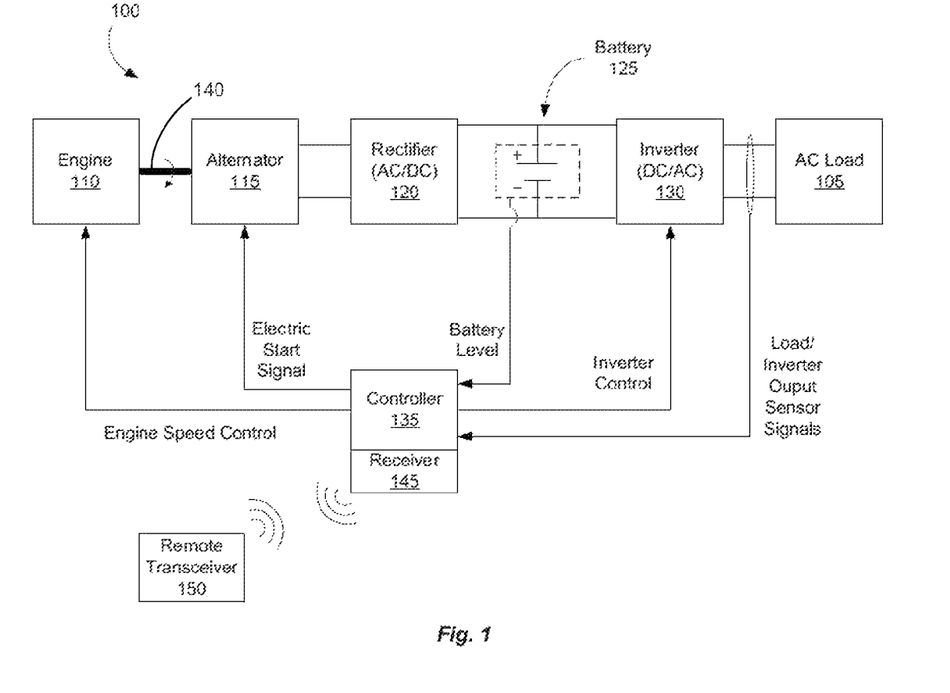
FIG. 1 depicts a hybrid inverter generator with an engine generator according to embodiments of the invention.

FIG. 1 depicts a hybrid inverter generator 100 coupled to an AC load 105. The generator 100 includes an engine 110, an alternator 115, a rectifier 120, a battery 125, an inverter 130, and a controller 135. The engine 110 is, for instance, a gas-powered combustion engine that rotates an output shaft 140 when enabled. The output shaft 140 rotates a rotor of the alternator 115. The rotating rotor induces an AC output from a stator of the alternator 115. The AC output by the alternator 115 is received by the rectifier 120.

The rectifier 120 converts the AC power received from the alternator 115 to DC power. The DC power is output from the rectifier 120 to the inverter 130. The battery 125 is coupled in parallel between the rectifier 120 and inverter 130. That is, a positive terminal of the battery 125 is coupled to a positive output of the rectifier 120 and to a positive input of the inverter 130, and a negative terminal of the battery 125 is coupled to a negative output of the rectifier 120 and to a negative input of the inverter 130. The inverter 130 inverts the DC power received from one or both of the rectifier 120 and battery 125 to AC power using, for instance, high-speed switching elements controlled by the controller 135 via inverter control signals.

The AC power output by the inverter 130 is received by an AC load 105. The AC load 105 includes one or more AC-powered devices. The AC load 105 is coupled to the generator 100 via, for instance, a two or three-prong AC outlet on an outer casing of the generator 100. In some instances, the generator 100 includes multiple AC outlets for separately coupling multiple AC loads 105 to the generator 100.

The controller 135 monitors the battery 125 and load demand of the AC load 105. The controller monitors the voltage level of the battery 125. In some embodiments, the battery 125 has internal circuitry for monitoring its own voltage level and outputs a signal representative of its voltage level to the controller 135. In other embodiments, the controller 135 directly measures the voltage and/or current level being output by the battery 125 to determine the battery level. The load demand of the AC load 105 is determined by, for example, the controller 135 monitoring the amount of current being drawn by the AC load 105. The controller 135 also monitors the voltage level and frequency of the AC power output by the inverter 130.

The controller 135 controls and is coupled to the engine 110 and alternator 115. The controller 135 is operable to adjust a throttle of the engine 110 to control the speed thereof. For instance, the throttle is controlled by sending control signals to a stepper motor or other device that receives electrical control signals and provides mechanical control of a throttle. Additionally, the controller 135 controls the alternator 115 to function as a starter motor for the engine 110 to optionally start the engine without the use of a recoil. For instance, a starting circuit (not shown) coupling the battery 125 and the alternator 115 may be selectively enabled by the controller 135 to provide power from the battery 125 to the stator of the alternator 115. The power received by the stator causes rotation of the rotor of the alternator 115, which is coupled to the output shaft 140 of the engine 110. Rotation of the output shaft 140 along with opening the throttle to provide fuel to the engine 110 enables starting of the engine 110. In some embodiments, a pull or recoil starter or separate electric motor starter (not combined with the alternator) is provided in place of or in addition to the aforementioned electronic starting system.

In addition, in some embodiments, the controller 135 induces a wireless receiver 145 for receiving control signals from a remote transceiver 150. The remote transceiver 150 is operable to send control signals to the controller 135.

Example control signals include an on/off signal to selectively turn the inverter generator on and off and a sleep timer to turn off the inverter generator after a predetermined amount of time.

The controller 135 includes or is connected to a memory such as RAM and ROM and executes software that can be stored in the RAM (particularly during execution), the ROM (on a generally permanent basis), or another non-transitory computer readable medium such as other memory or disc. If necessary, the controller can be connected to such memory or a disc drive to read such software. In some embodiments, the controller is a microcontroller, microprocessor, field programmable gate array (FPGA), application specific integrated circuit (ASIC), or other programmable device with suitable memory and I/O devices.

In some embodiments, a DC load (not shown) is coupled to the DC output of the rectifier 120 and battery 125. In some instances, a DC-to-DC converter is coupled between the DC load and the DC output of the rectifier 120 and battery 125 to condition the DC power to an appropriate level.

Figure 2:
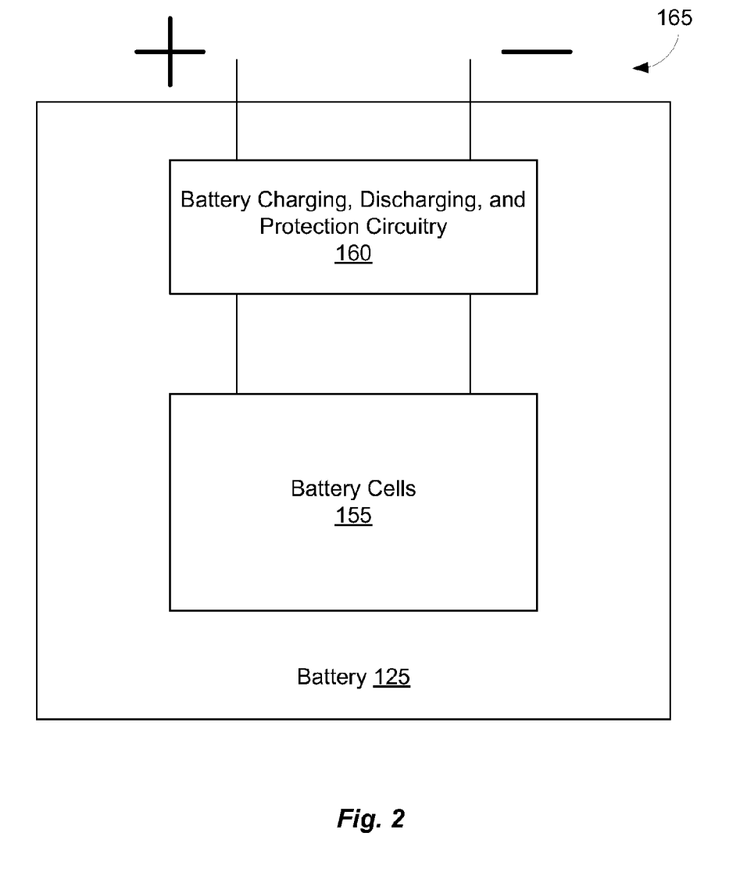
FIG. 2 depicts a battery used in the hybrid inverter generator.

FIG. 2 depicts the battery 125 in greater detail. The battery 125 includes one or more battery cells 155, battery charging, discharging, and protection circuitry (battery circuitry) 160, and terminals 165. In some instances, the battery circuitry 160 is external to the battery 125 and, in some cases, integrated with the controller 135. The battery cells 155 include 45-60 lithium-ion cells generally outputting 180-300 $V_{DC}$, which may be removable in some embodiments. Since the battery 125 has a relatively high DC output, the battery 125 is coupled to the inverter 130 without a boost circuit to boost the DC output of the battery 125, such as a DC/DC or DC/AC/DC power converter. Lithium-ion cells have a faster charging capability, a smaller size, and a better power-to-weight ratio relative to lead acid or Ni-Cad batteries. In other embodiments, however, the battery 125 includes a different number of battery cells, a different type of battery cell, and a different voltage output. For instance, in some embodiments, lead acid, Ni-Cad, and other battery types are used to reduce costs. In some embodiments, if the battery 125 outputs a lower DC output, a boost circuit may be used to increase the DC input to the inverter 130. The battery circuitry 160 includes charging circuitry for receiving DC power at the terminals 165 and providing charging power to the battery cells 155. The battery circuitry 160 also includes discharging circuitry for providing DC power from the battery cells 155 to the terminals 165. The discharging circuitry may include filtering circuitry to condition the output power to meet particular voltage, current, and noise specifications. The protection circuitry detects when the battery cells 155 are at or below a minimum threshold ("battery protection threshold") and prevents further discharge of the battery cells 155. Preventing further discharge prevents damage to the battery cells 155.

The battery 125 also stabilizes DC output from the rectifier 120. In some embodiments, the generator 100 includes a voltage regulator circuit (not shown) to provide additional regulation and stabilization of the DC output from the rectifier 120. The voltage regulator circuit may be within the battery circuitry 160 or outside the battery 125.

The battery 125, which may include one or more batteries coupled in series and/or in parallel, is coupled to the hybrid inverter generator 100 using various techniques. For instance, in some embodiments, the battery 125 is built into the generator such that it is non-modular and not removable by the user. For instance, the battery 125 may be hard-wired to electrical terminals of the generator to prevent a user from removing the battery 125 during general use (e.g., without cutting wires or breaking soldered connections). In some embodiments, the hybrid inverter generator 100 includes one or more battery receptacles for selectively inserting one or more batteries 125 into the generator circuit shown in FIG. 1. In such embodiments, the receptacles and batteries have electrical contacts (i.e., electrical terminals) that are coupled when the battery is inserted into the receptacle. In some embodiments, a combination of one or more built-in batteries 125 and selectively inserted batteries 125. The option to selectively insert batteries 125 enables a user to adjust the length of time that the hybrid inverter generator 100 is able to run by battery power alone and enables a user to charge one or more batteries 125 for other use (e.g., to provide power to battery-operated power tools). In instances with multiple batteries 125, the batteries 125 may be referred to as a battery bank.

In some instances, multiple receptacles are used that receive the same battery type and size, that receive a unique battery type or size, that receive multiple battery types or sizes, or a combination thereof. In some embodiments, one or more battery receptacles are exposed on the outside of a housing of the generator to, for example, enable quick insertion and removal by a user. In some embodiments, one or more battery receptacles are placed within a housing of the generator 100, for example, to protect the batteries 125 from the weather or other potential sources of damage. Additionally, in some embodiments, one or more external batteries 125 are coupled to the hybrid inverter generator 100 via cables attached to terminals (not shown) on the generator 100. The external battery may be used in combination with the built-in batteries and selectively inserted batteries described above. In embodiments with multiple batteries 125, the battery charging, discharging, and protection circuitry 160 may be shared by the multiple batteries 125. However, in other embodiments, one or more of the batteries 125 each include separate battery charging, discharging, and protection circuitry 160.

Figure 3:
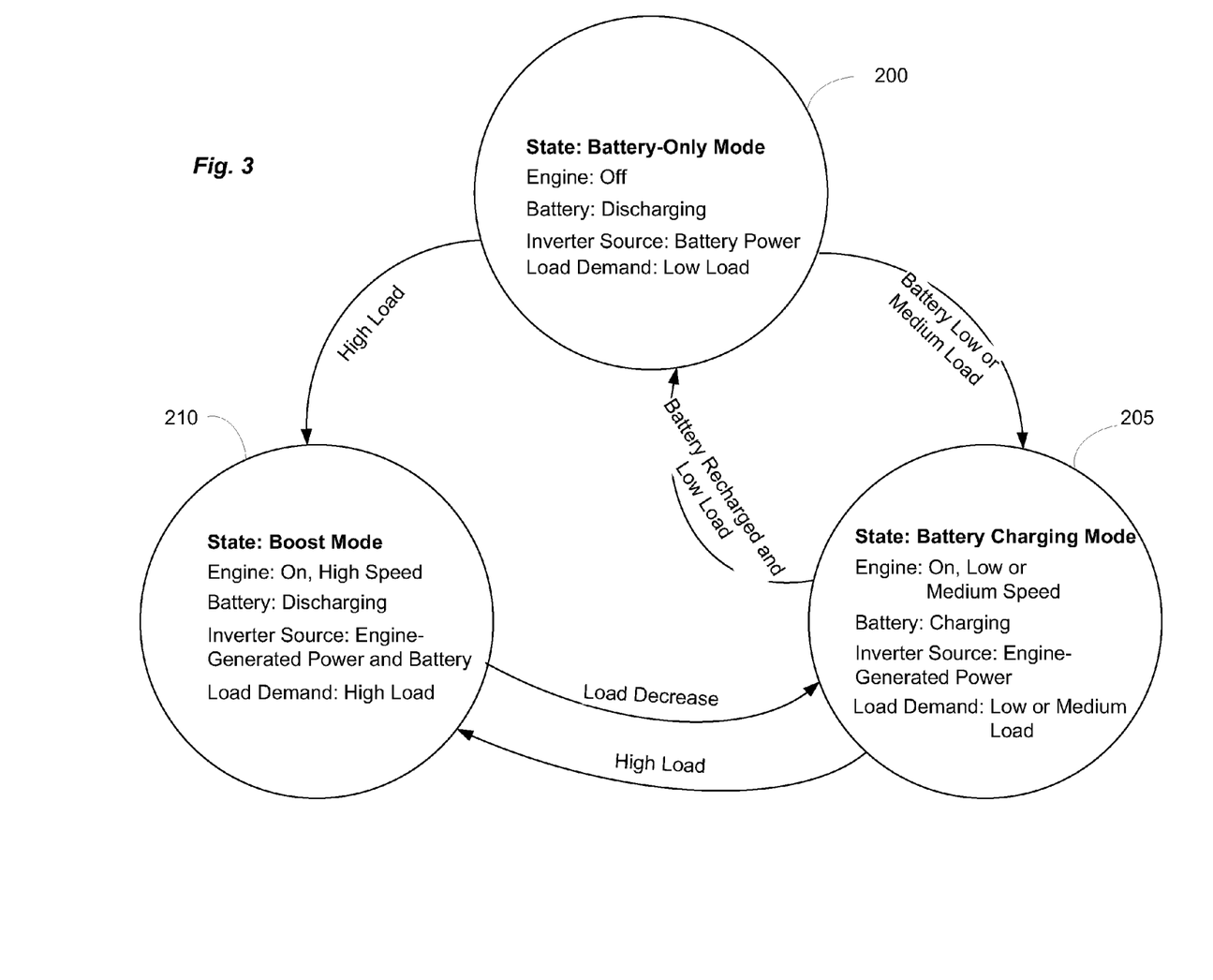
FIGS. 3-4 depict state diagrams illustrating modes of operation of the hybrid inverter generator.

The hybrid inverter generator 100 uses the battery 125, the engine 110, and a combination thereof to generate and provide output power to the AC load 105. FIG. 3 includes a state diagram illustrating three modes of operation of the generator 100. In a battery-only mode 200, the engine 110 is disabled and the battery 125 provides the DC output to the inverter 130. The battery-only mode 200 is used for low load demands and is generally the starting operational mode for the generator 100. The generator 100 leaves the battery only mode 200 when 1) the battery 125 drops below a predetermined low battery threshold, or 2) the load demand of the AC load 105 increases above a medium or high level. If the battery 125 drops below a low battery threshold (e.g., below 10% of total battery capacity) or the load demand of the AC load 105 increases to a medium level, the generator 100 enters a battery charging mode 205. In the battery charging mode 205, the controller 135 detects the low battery situation and sends a start engine signal to the alternator 115. The controller 135 also controls the throttle to maintain the engine 110 1) at a low or idling speed if the load demand of the AC load 105 is at a low level and 2) at a medium speed if the load demand of the AC load 105 is at a medium level. The generator 200 remains in the battery charging mode until either 1) the load demand changes to a high load or 2) the load demand changes to a low load and the battery 125 is charged above a charged battery threshold, which is generally above the low battery threshold (see, e.g., FIG. 6). In some embodiments, even after the battery has been charged above the charged battery threshold, the engine may continue to operate at a low or medium speed for a predetermined amount of time while the battery charging, discharging, and protection circuitry 160 prevents overcharging of the battery.

Regardless of whether the generator 100 is in the battery-only mode 200 or the battery charging mode 205, the generator proceeds to the boost mode 210 if the load demand increases to a high load level (e.g., at start-up of a power tool or appliance). In the boost mode 210, the engine 110 is turned on (if necessary) and controlled to operate at a high speed. Additionally, the battery 125 is controlled to discharge DC power. Thus, the DC power output by the rectifier 120, which is generated by the engine 110 and alternator 115, is boosted by the battery 125 to provide a boosted DC power level to the inverter 130. The inverter 130 is, in turn, able to output more power to meet a higher load demand than otherwise possible with the engine 110 or battery 125 alone.

The generator 100 leaves the boost mode 210 upon a load decrease and returns to the battery charging mode 205, as the battery 125 will likely need charging after being in the boost mode 210. In some instances, however, after the load demand decreases to a low load level from the high load level, the generator 100 proceeds to the battery-only mode 200 if the battery 125 is above the low battery threshold. If, while in the boost mode 210, the battery 125 is drained below the battery protection threshold and the protection circuitry of the battery circuitry 160 is activated, the engine 110 operates at a high speed and the battery 125 neither charges nor discharges. Rather, the battery 125 maintains its present level of charge until the generator 100 leaves the boost mode 210 and returns to the battery charging mode 205.

When the load demand of the AC load 105 increases, the battery 125 is first used to meet the increase in load demand until the engine 110 can either be started (e.g., going from mode 200 to 205 or 210) or until the speed of the engine 110 is sufficiently increased (e.g., going from mode 205 to 210). Thus, the battery 125 enables the generator 100 to quickly react to and satisfy changes in load demand. As such, although the battery 125 is primarily charging in battery charging mode 205, the battery 125 is also used to output power in certain instances while the generator 100 is in battery charging mode 205.

Figure 4:
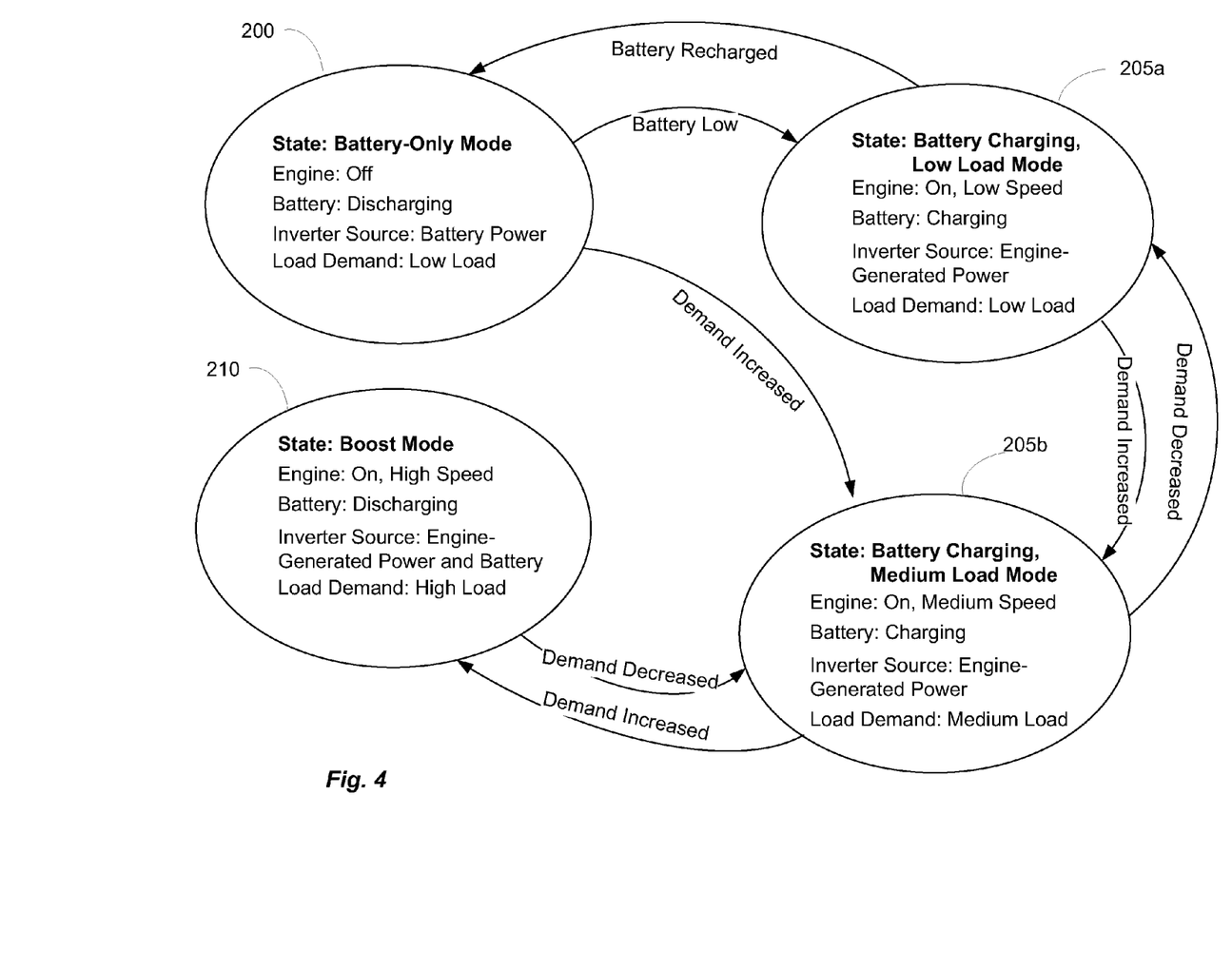

FIG. 4 provides another state diagram illustrating four modes of operation of the generator 100. In FIG. 4, the battery-only mode 200 and boost mode 210 operate as in FIG. 3, but the battery charging mode 205 is separated into two modes: battery charging, low load mode 205a and battery charging, medium load mode 205b. In battery charging, low load mode 205a, the engine is operating at a low or idling speed to charge the battery 125 and supply power to the low load demand of the AC load 105. In battery charging, medium load mode 205b, the engine is operating at a medium speed to charge the battery 125 and supply power to meet the medium load demand of the AC load 105. In FIG. 4, the generator 100 switches between modes as a result of either the battery 125 being below a low battery threshold, above a charged battery threshold, or an increase or decrease in the load demand of AC load 105. In contrast to the state diagram of FIG. 3, the generator 100 only switches to the boost mode 210 through the battery charging, medium load mode 205b. In some embodiments, however, the generator 100 switches directly to the boost mode 210 upon detecting a high load demand of the AC load 105, rather than first passing through battery charging, medium load mode 205b. In some embodiments, even after the battery has been charged above the charged battery threshold while in low load mode 205a, the engine may continue to operate at a low or medium speed for a predetermined amount of time while the battery charging, discharging, and protection circuitry 160 prevents overcharging of the battery. Additionally, in the modes of both FIGS. 3 and 4, when the load decreases below a load threshold that would necessitate switching modes, the hybrid inverter generator 100 uses a time delay before stepping down the power output in some embodiments. With this delay, the hybrid inverter generator 100 avoids switching between modes and adjusting engine speed unnecessarily when the load demand fluctuates above and below a load demand threshold.

Figure 5:
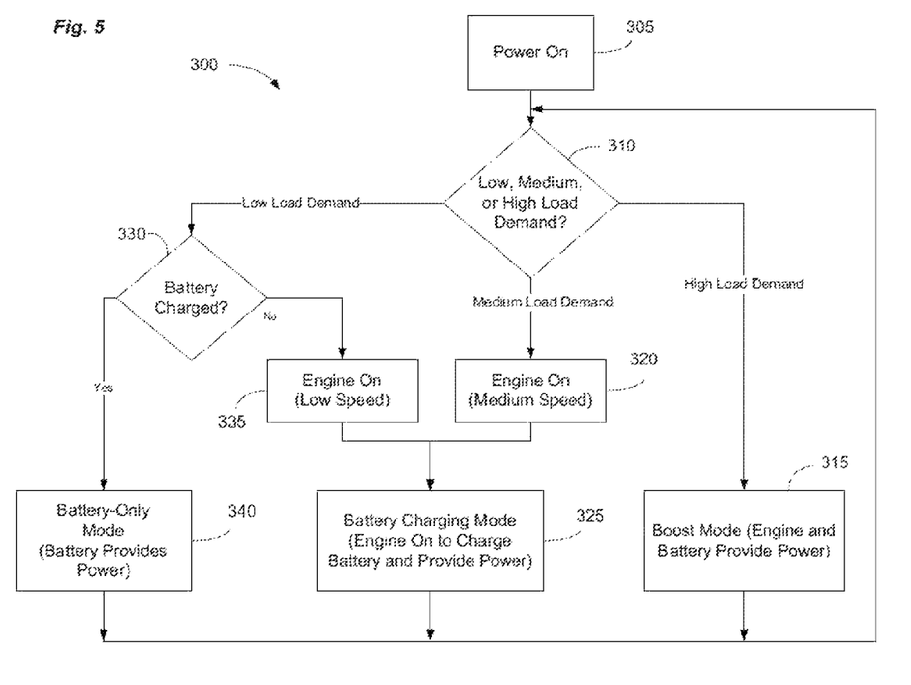
FIG. 5 illustrates a method of operating a hybrid inverter generator according to embodiments of the invention.

FIG. 5 illustrates a method 300 of controlling a hybrid generator, such as generator 100, according to some embodiments of the invention. In step 305, the generator 100 is enabled, for example, by depressing a power-on button, toggling an on/off switch, or through remote activation. Thereafter, the controller 135 determines the load demand of the AC load 105 (step 310). If the load demand is high, the controller 135 controls the generator 100 to operate in the boost mode 210 (step 315). If the controller 135 determines that the load demand is medium in step 310, the controller 135 controls the engine 110 to operate at a medium speed (step 320) and the generator 100 to operate in the battery charging mode 205 (step 325), which is also referred to as the battery charging, medium load mode 205b. If the controller 135 determines that the load demand is low in step 310, the controller 135 determines the charge level of the battery 125 (step 330). If the charge level is below a low battery threshold, the controller 135 proceeds to step 335 and controls the engine 110 to operate at a low speed. Thereafter, the controller 135 controls the generator 100 to operate in the battery charging mode 205 (step 325), which is also referred to as the battery charging, low load mode 205a. If the charge level is above a low battery threshold, the controller 135 proceeds to step 340 and controls the generator 100 to operate in the battery-only mode 200 (step 340). In some embodiments, the steps of method 300 are performed in a different order to achieve a similar functionality (e.g., to achieve the state diagrams of FIG. 3 or 4.

Figure 6:
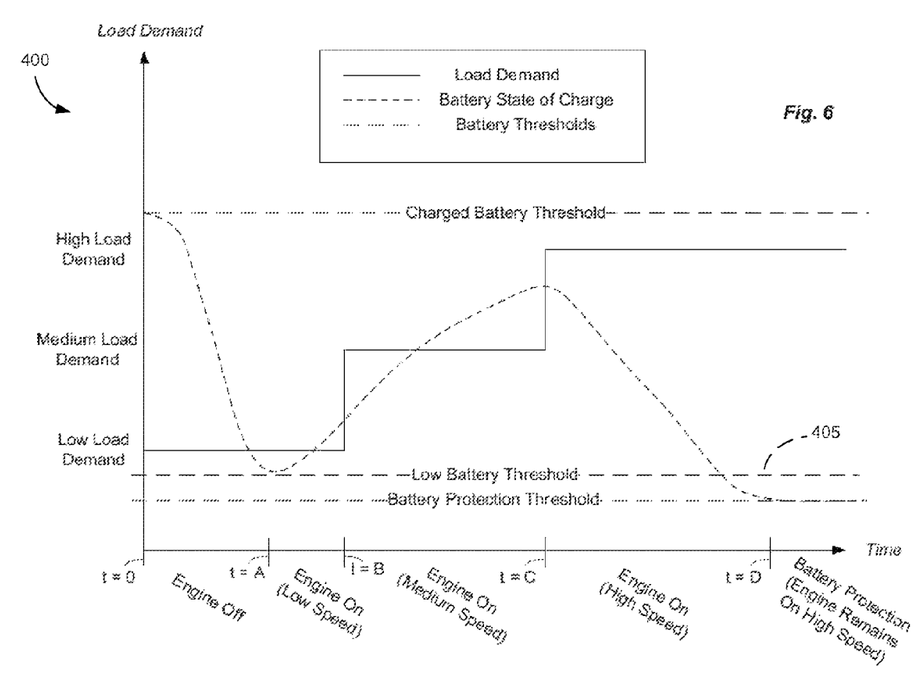
FIG. 6 depicts a plot of battery charge over time for a varying load demand.

FIG. 6 illustrates a plot 400 of the state of charge of the battery 125 over time with an exemplary changing load demand of AC load 105. At t=0, the battery 125 has a full charge and the AC load 105 has a low load demand. Thus, the generator 100 operates in a battery-only mode 200 and the battery discharges until t=A. At t=A, the charge of the battery 125 has dropped to the low battery threshold 405 and the generator 100 enters the battery charging, low load mode 205a. Thus, the charge of the battery 125 increase as the engine 110 operates at a low speed. At t=B, the load demand increases to a medium load demand. The generator 100 then enters the battery charging, medium load mode 205b, which continues to charge the battery 125 as the engine 110 operates at a medium speed. At t=C, the load demand increases to a high load demand. The generator 100 enters the boost mode 210, which discharges the battery 125 and operates the engine 110 at a high speed. At t=D, the charge of the battery 125 has reached a battery protection threshold and the battery circuitry 160 prevents further discharge of the battery 125. Although not depicted in FIG. 6, if after t=A, the charge of the battery 125 reached the charged battery threshold while the load demand was low, the generator 100 would return to the battery-only mode 200 and the engine 110 would be turned off.

Figure 7A:
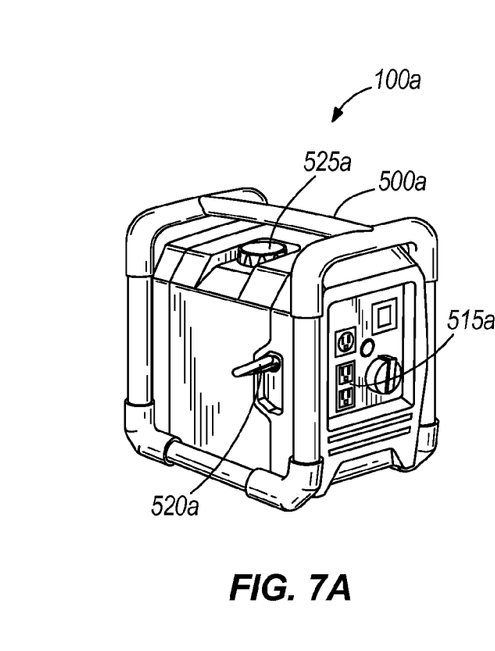
FIGS. 7A-C depict hybrid inverter generators according to embodiments of the invention.
Figure 7B:
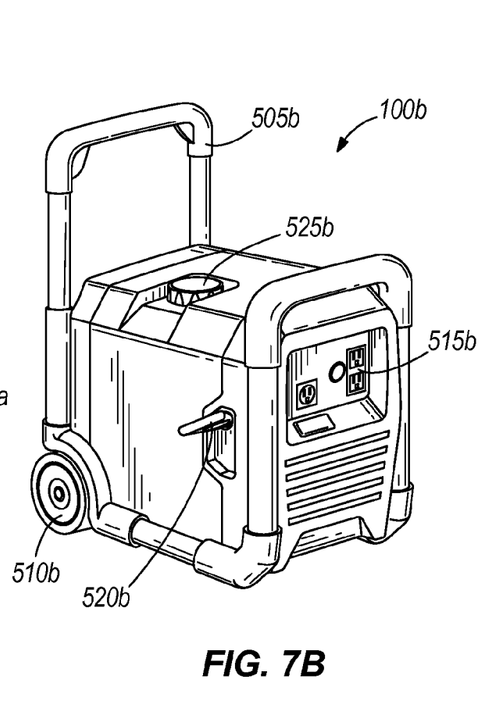
Figure 7C:
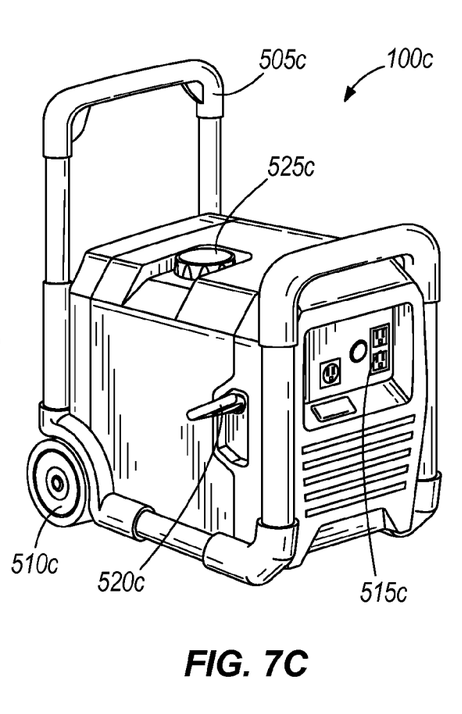

FIGS. 7A-C depict exemplary hybrid inverter generators 100a, 100b, and 100c, respectively, each with different power ratings (e.g., 1000 Watts, 2000 Watts, and 3000 Watts). The generator 100a is lighter than the generators 100b and 100c and includes a carrying handle 500a. The generators 100B and 100C include push handles 505b and 505c and wheels 510b and 510c, respectively. The generators 100a, 100b, and 100c, also include a control panel with outlet(s) 515a, 515b, and 515c, respectively; a recoil starter 520a, 520b, and 520c, respectively; and fuel caps 525*a*, 525*b*, and 525*c*, respectively, for covering access to internal fuel tanks. The generators 100*a*, 100*b*, and 100*c* also use internal cooling techniques, such as fans, heat sinks, cooling air flow paths, etc., to maintain the generators 100*a*, 100*b*, and 100*c* within proper operational temperatures.

In the case of a DC output and DC load coupled to the generator 100, the controller 135 considers the total load demand (load demand of AC load and DC load) of the generator 100 for the state diagrams of FIGS. 3 and 4 and the method of FIG. 5. In some embodiments, the generator 100 includes an AC or DC power-in cable or outlet to receive power to charge the battery 125. This enables charging of the battery 125 without starting the engine 110.

In some embodiments, the generator 100 includes a physical switch to prevent the use of engine 110. This switch enables the generator 100 to rely solely on the battery 125 to produce power, which may be desirable in indoor areas or areas where very low noise operation is desired. In some embodiments, one or more additional physical switches or other inputs enable a user to particularly select one of the generator 100 operation modes 200, 205, and 210, overriding the automatic mode selection by the controller 135.

Although the modes of the generator 100 were described above as having three discrete engine speeds and load demand levels and three or four discrete operation modes, additional discrete modes, engine speeds, and load demand levels are used in other embodiments. For example, instead of low, medium, and high engine speeds, the controller 135 is operable to adjust the engine 110 to additional speeds to more precisely meet various load demands (e.g., in modes 205 and 210).

Figure 8:
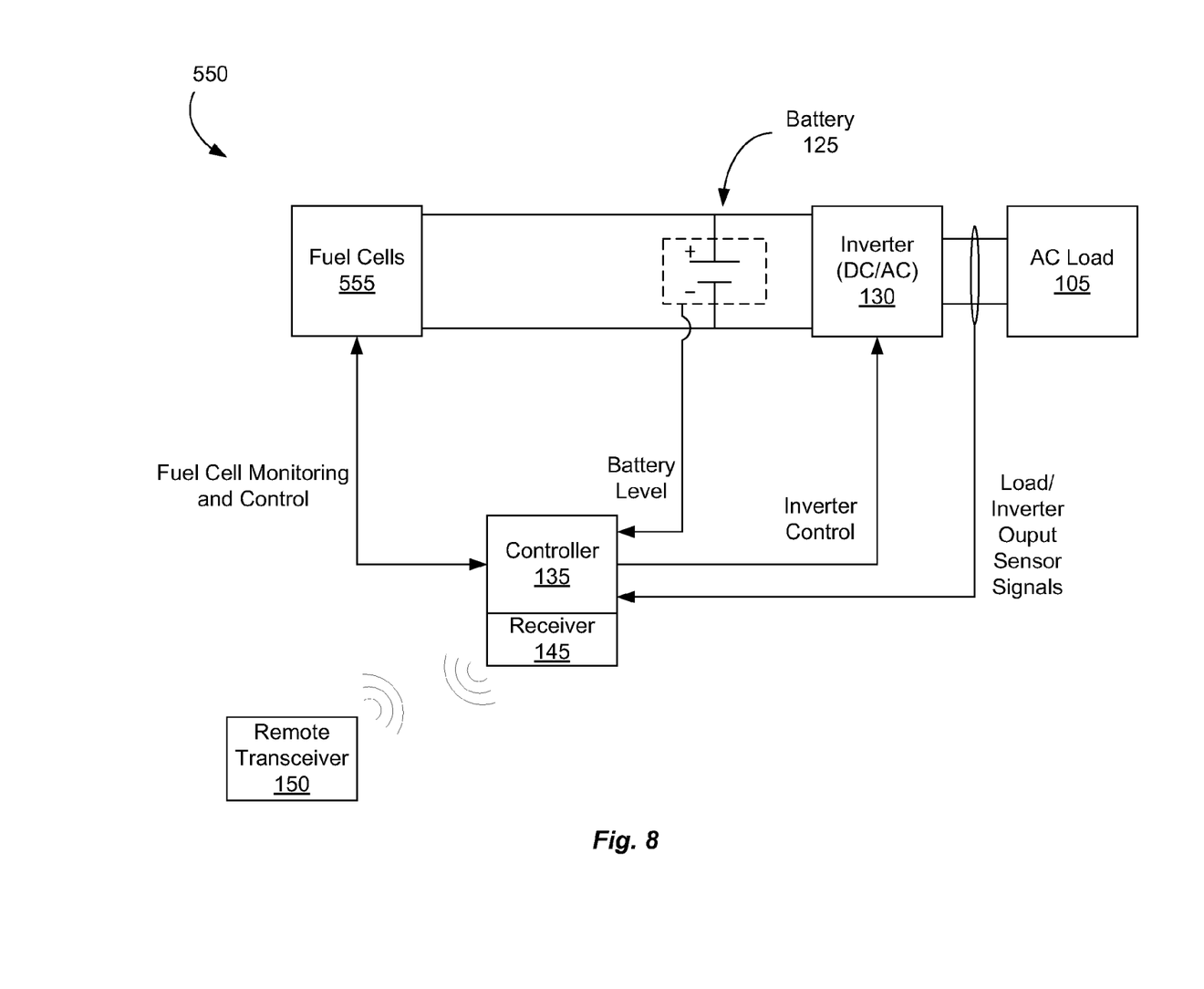
FIG. 8 depicts a hybrid inverter generator with fuel cells according to embodiments of the invention.

FIG. 8 depicts a hybrid inverter generator 550 that is similar to the hybrid inverter generator 100, but replaces the engine 110, alternator 115, and rectifier 120 with fuel cells 555. Unless otherwise specified herein, components of the hybrid inverter generator 550 with the same element numbers as the hybrid inverter generator 100 generally operate in the same manner. The fuel cells 555 output DC power to the battery 125, similar to how the rectifier 120 outputs DC power to the battery 125. The controller 135 communicates with the fuel cells 555 to monitor and control the generation of DC power, rate of fuel consumption, etc., similar to how the controller 135 controls the generation of AC power and engine speed of engine 110 in the hybrid inverter generator 100 of FIG. 1. For instance, as the controller 135 adjusts the engine rate of speed in the various modes to meet changing load demands (see, e.g., FIGS. 3-6), the controller 135 also controls the fuel cells 555 to adjust their power output level according to the various modes.

The fuel cells 555 include one or more electrochemical cells that generate DC power from a chemical reaction between a fuel and an oxidant. In some embodiments, the fuel cells 555 are hydrogen fuel cells that use hydrogen as a fuel and oxygen as an oxidant. In some embodiments, other fuel types (e.g., hydrocarbons or alcohols) and oxidant types (e.g., chlorine or chlorine dioxide) are used.

Thus, the invention provides, among other things, a hybrid engine and battery generator and a method of operating the same. The various modes of operation offer flexibility in power output and noise levels of the generator. Various features and advantages of the invention are set forth in the following exemplary claims. These claims describe various embodiments of the invention, but the invention may include additional embodiments not claimed herein.

What is claimed is:

1. A hybrid inverter generator, the generator comprising:
   an engine including a rotatable shaft;
   an alternator including an AC alternator output, wherein the alternator is rotationally driven by the rotatable shaft to produce AC alternator power;
   a rectifier including a DC rectifier output and coupled to the AC alternator output, wherein the rectifier converts AC alternator power received from the AC alternator output to DC power and outputs the DC power along the DC rectifier output;
   an inverter including a DC inverter input coupled to the DC rectifier output, wherein the inverter inverts DC power received via the DC inverter input to AC power for supply to an AC load;
   electrical terminals configured to be coupled to a battery, wherein the electrical terminals are connected in parallel with the rectifier output and the DC inverter input;
   a controller operable to control the generator to operate in the following three modes:
      a battery-only mode, wherein the rectifier does not provide DC power along the DC rectifier output and the battery provides DC power to the DC inverter input,
      a battery charging mode, wherein the battery receives DC power from the DC rectifier output and the DC inverter input receives DC power from the DC rectifier output, and
      a boost mode, wherein the DC inverter input receives DC power from both the battery and the DC rectifier output;
   a housing that houses the engine, the alternator, the rectifier, the inverter, and the controller; and
   an AC outlet on the housing coupled to the inverter to receive the AC power and operable to receive a plug of the AC load.

2. The hybrid inverter generator of claim 1, wherein the battery is hard-wired to the DC rectifier output and the DC inverter input.

3. The hybrid inverter generator of claim 1, further comprising a battery receptacle for selectively receiving the battery.

4. The hybrid inverter generator of claim 3, wherein the battery is a power tool battery operable to provide power to a power tool when removed from the generator and electrically coupled to the power tool.

5. The hybrid inverter generator of claim 1, wherein the battery has an output level of between approximately 180 and 300 Volts DC.

6. The hybrid inverter generator of claim 1, further comprising a receiver that receives wireless control signals from a remote transceiver to control the generator.

7. The hybrid inverter generator of claim 1, wherein the controller is further operable to
   determine a load demand of the AC load;
   determine a battery level of the battery; and
   control the generator to operate in one of the battery-only mode, the battery charging mode, and the boost mode based on the determined load demand and battery level.

8. The hybrid inverter generator of claim 1, wherein, in the battery charging mode and the boost mode, the controller is operable to control the engine speed based on the load demand.

9. The hybrid inverter generator of claim 1, wherein the battery is coupled to the DC inverter input via a path not having a DC/DC converter circuit for increasing a DC voltage level output by the battery.

10. A method of operating a hybrid engine battery generator, the method comprising:
- receiving, by an outlet on a housing of the generator, a plug of a load to couple the load to the generator;
- determining a load demand of the load coupled to the outlet;
- determining a battery level of a battery electrically coupled to the generator;
- selecting a mode of operation for the generator based on the battery level and the load demand, wherein selecting the mode of operation includes
  - operating the generator in a battery-only mode, wherein
    - an engine of the generator does not provide rotational output, and
    - the battery provides DC power to an inverter via a path not having a DC/DC converter circuit for increasing a DC voltage level output by the battery;
  - operating the generator in a battery charging mode, wherein
    - the engine provides rotational output to an alternator,
    - the alternator provides AC output to a rectifier, and
    - the rectifier charges the battery and provides DC power to the inverter; and
  - operating the generator in a boost mode, wherein
    - the engine provides rotational output to the alternator,
    - the alternator provides AC output to the rectifier, and
    - both the rectifier and the battery provide DC power to the inverter.

11. The method of claim 10, wherein:
the generator is operated in the battery-only mode if the load demand is below a low load threshold and the battery level is above a low battery threshold,
the generator is operated in the battery charging mode if the load demand is between the low load threshold and a high load threshold or the battery level is below the low battery threshold, and
the generator is operated in the boost mode if the load demand is above the high load threshold.

12. The method of claim 10, wherein the battery charging mode comprises a battery charging, low load mode and a battery charging, medium load mode.

13. The method of claim 12, further comprising:
operating the generator in the battery charging, low load mode with the engine operating at a first speed and a load demand being at a first load level;
operating the generator in the battery charging, medium load mode with the engine operating at a second speed and the load demand being at a second load level, wherein the second speed is greater than the first speed to meet the second load demand, which is greater than the first load demand.

14. The method of claim 10, wherein, in the battery-only mode and the boost mode, the battery provides DC power to the inverter between approximately 180 and 300 Volts DC.

15. The method of claim 10, further comprising removing the battery from a battery receptacle of the generator and inserting a second battery into the battery receptacle.

16. The method of claim 10, further comprising receiving wireless control signals from a remote transceiver to control the generator.

17. A hybrid inverter generator, the generator comprising:
- an engine including a rotatable shaft;
- an alternator including an AC alternator output, wherein the alternator is rotationally driven by the rotatable shaft to produce AC alternator power;
- a rectifier including a DC rectifier output and coupled to the AC alternator output, wherein the rectifier converts AC alternator power received from the AC alternator output to DC power and outputs the DC power along the DC rectifier output;
- an inverter including a DC inverter input coupled to the DC rectifier output, wherein the inverter inverts DC power received via the DC inverter input to AC power for supply to an AC load;
- a battery bank coupled in parallel to the DC rectifier output and the DC inverter input, the battery bank including a hardwired battery and a selectively removable battery;
- a controller operable to control the generator to operate in the following three modes:
  - a battery-only mode, wherein the rectifier does not provide DC power along the DC rectifier output and the hardwired battery and the selectively removable battery provide DC power to the DC inverter input,
  - a battery charging mode, wherein the hardwired battery and the selectively removable battery receive DC power from the DC rectifier output and the DC inverter input receives DC power from the DC rectifier output, and
  - a boost mode, wherein the DC inverter input receives DC power from the hardwired battery, the selectively removable battery, and the DC rectifier output.

18. The hybrid inverter generator of claim 17, wherein the selectively removable battery is a power tool battery operable to provide power to a power tool when removed from the generator and electrically coupled to the power tool.

19. The hybrid inverter generator of claim 17, wherein the hardwired battery provides between approximately 180 and 300 Volts DC.

20. The hybrid inverter generator of claim 17, wherein the controller is further operable to
determine a load demand of the AC load;
determine a first battery level for the hardwired battery level and a second battery level for the selectively removable battery; and
control the generator to operate in one of the battery-only mode, the battery charging mode, and the boost mode based on the first and second battery levels.

21. The hybrid inverter generator of claim 17, wherein the battery bank is coupled to the DC inverter input via a path not having a DC/DC converter circuit for increasing a DC voltage level output by the battery.

\* \* \* \* \*